United States Patent
Moens et al.

(10) Patent No.: US 6,635,721 B1
(45) Date of Patent: Oct. 21, 2003

(54) POWDER COATING OF SEMICRYSTALLINE AND AMORPHOUS POLYESTERS WITH CROSSLINKER

(75) Inventors: Luc Moens, Sint-Genesius-Rode (BE); Patrick Loosen, Ruisbroek (BE); Daniel Maetens, Brussels (BE); Jean-Marie Loutz, Brussels (BE)

(73) Assignee: UCB, S.A., Brussels (BE)

( * ) Notice: Subject to any disclaimer, the term of this patent is extended or adjusted under 35 U.S.C. 154(b) by 0 days.

(21) Appl. No.: 09/664,451

(22) Filed: Sep. 18, 2000

Related U.S. Application Data

(63) Continuation of application No. 09/077,517, filed as application No. PCT/BE96/00127 on Dec. 5, 1996, now abandoned.

(30) Foreign Application Priority Data

Dec. 6, 1995 (BE) ............................................. 09501000

(51) Int. Cl.$^7$ .............................. C08L 67/03; B05D 3/02
(52) U.S. Cl. ...................... 525/438; 523/461; 524/513; 524/604; 525/173; 525/174; 525/176; 525/444; 427/385.5; 427/386
(58) Field of Search .................................. 525/438, 934, 525/173, 174, 176, 444; 523/461; 524/513, 604; 427/385.5, 386

(56) References Cited

U.S. PATENT DOCUMENTS

| | | | |
|---|---|---|---|
| 4,889,890 A | 12/1989 | Kerr et al. .................. 525/438 |
| 5,097,006 A | 3/1992 | Kapilow et al. ............ 525/437 |
| 5,182,337 A | 1/1993 | Pettit, Jr. et al. ........... 525/934 |
| 5,373,084 A | 12/1994 | Chang ........................ 525/437 |
| 5,439,988 A | 8/1995 | Moens et al. ............... 525/438 |
| 5,728,779 A | 3/1998 | van de Werff et al. ..... 525/438 |

FOREIGN PATENT DOCUMENTS

| | | |
|---|---|---|
| EP | 365428 | 4/1990 |
| WO | 91/14745 | 10/1991 |
| WO | 95/01406 | 1/1995 |
| WO | 95/01407 | 1/1995 |

*Primary Examiner*—Robert E. L. Sellers
(74) *Attorney, Agent, or Firm*—Wenderoth, Lind & Ponack L.L.P.

(57) ABSTRACT

Thermosetting powder compositions comprising as binder a mixture of polyesters containing carboxyl groups and of a crosslinking agent having functional groups capable of reacting with the carboxyl groups.

The polyesters comprise:

(a) a semicrystalline polyester containing carboxyl groups, which comprises, with respect to the total amount of alcohols, of from 85 to 100 mol % of 1,4-cyclohexanediol and of from 0 to 15 mol % of at least one other aliphatic and/or cycloaliphatic polyol and, with respect to the total amount of acids, of from 85 to 100 mol % of a straight-chain saturated dicarboxylic aliphatic acid having from 4 to 14 carbon atoms and of from 0 to 15 mol % of at least one other aliphatic and/or cycloaliphatic and/or aromatic polycarboxylic acid; and (b) an amorphous polyester containing carboxyl groups, which comprises, with respect to the total amount of acids, of from 70 to 100 mol % of isophthalic acid and of from 0 to 30 mol % of at least one other aliphatic and/or cycloaliphatic and/or aromatic polycarboxylic acid and, with respect to the total amount of alcohols, of from 70 to 100 mol % of neopentyl glycol and/or of 2-butyl-2-ethyl-1,3-propanediol and of from 0 to 30 mol % of at least one other aliphatic and/or cycloaliphatic polyol.

26 Claims, No Drawings

POWDER COATING OF SEMICRYSTALLINE AND AMORPHOUS POLYESTERS WITH CROSSLINKER

This is a continuation of application Ser. No. 09/077,517, filed May 29, 1998, now abandoned, which is a 371 of PCT/BE96/00127, filed Dec. 5, 1996.

DESCRIPTION

The present invention relates to thermosetting powder compositions comprising as binder a mixture of an amorphous polyester containing carboxyl groups, of a semicrystalline polyester containing carboxyl groups and of a crosslinking agent having functional groups capable of reacting with the carboxyl groups of these polyesters, and in particular to thermosetting powder compositions which, by curing, give coatings which have very good weatherability and have good mechanical properties.

The invention also relates to the use of these compositions for the preparation of powder paints and varnishes allowing these coatings to be produced, as well as to the coatings thus obtained.

Thermosetting powder compositions are well known in the art and are widely used a paints and varnishes for the coating of the most varied of articles. These powders have many advantages; on the one hand, the problem of solvents is completely eliminated, and on the other hand the powders are 100% used, given that only the powder in direct contact with the substrate is retained by the latter, any excess powder being, in principle, completely recoverable and reusable. This is why these powder compositions are preferred to coating compositions in the form of solutions in an organic solvent.

Thermosetting powder compositions have already been widely used in the coating of domestic electrical appliances, accessories for the motor-vehicle industry etc. They generally contain thermosetting organic compounds constituting the binder of the pain, fillers, pigments, catalysts and various additives in order to match their properties to their use.

Various types of thermosetting powder compositions exist. The most widely known compositions contain as binder either a mixture of polymers containing carboxyl groups, such as a carboxyl-group containing polyester or a carboxyl-group-containing polyacrylate, and of epoxy compounds such as triglycidyl isocyanutate or acrylic copolymers containing glycidyl groups or β-hydroxyalkylamides, or a mixture of polymers containing hydroxyl groups, usually a hydroxyl-group-containing polyester, with blocked or unblocked isocyanates, glycolouril or melamine resins, polycarboxylic acid anhydrides, etc.

Polyesters containing carboxyl groups or hydroxyl groups which can be used for the preparation of powder varnishes and paints have already formed the subject of numerous publications. These polyesters are usually prepared from aromatic polycarboxylic acids, mainly terephthalic acid and isophthalic acid and optionally a minor proportion of aliphatic or cycloaliphatic dicarboxylic acids, and from various aliphatic polyols such as, for example, ethylene glycol, neopentyl glycol, 1,4-butanediol, trimethylolpropane, etc. These polyesters based on aromatic dicarboxylic acids, when they are used with a suitable crosslinking agent, provide thermosetting compositions which give paint and varnish coatings having good properties both with regard to their appearance and with regard to their mechanical properties (impact strength, flexibility, etc.). Some of these polyesters and the powders prepared from them are also commonly employed because of their outstanding weatherability properties.

This latter type of polyester generally contains, as acid, mostly isophthalic acid. However, although the coatings obtained from these polyesters have good weatherability, they do not on the other hand have good mechanical strength.

Currently, the great majority of polyesters used in the thermosetting powder compositions are amorphous polyesters. However, when the polyester is amorphous it is difficult to prepare perfect pulverulent thermosetting compositions, because they must satisfy often contradictory criteria. Thus, these powders must not reagglomerate while they are being handled, transported and stored, which means that the amorphous polyester must have a sufficiently high glass transition temperature ($T_g$). On the other hand, for the powder particles to be able to coalesce and form a perfectly homogenous and uniform coating, it is necessary for its viscosity at the curing temperature, and therefore the glass transition temperature ($T_g$) of the polyester, to be sufficiently low to ensure good wetting of the pigments and other solid materials accompanying the polyester in the formulation of the said thermosetting powder compositions. In addition, the powder must be capable of melting at the curing temperature in order to form an even film before the crosslinking reaction leading to final curing commences. In order to obtain good spreading of the molten film on the surface of the substrate, it is therefore necessary for the melt viscosity of the polyester to be sufficiently low. This is because a very high melt viscosity prevents good spreading of the molten film and results in a loss of evenness and of gloss in the coating. Finally, the rate of the crosslinking reaction of the composition, at a given temperature, may be controlled only by varying the quantity and/or nature of the crosslinking agent and of the optionally used crosslinking catalyst.

These various problems are solved in powder compositions of which the binder is formed by a semicrystalline polyester containing carboxyl groups or hydroxyl groups, this semicrystalline polyester being used alone or as a mixture with an amorphous polyester containing carboxyl or hydroxyl groups. This is because the properties of semicrystalline polyesters make it possible to avoid, to a large extent, the drawbacks described previously which arise from controlling the glass transition temperature ($T_g$), the melt viscosity and the reactivity of amorphous polyesters.

Firstly, semicrystalline polyesters have a high melting point and, as the case may be, a low glass transition temperature ($T_g$). Consequently, the melt viscosity of semicrystalline polyesters is much lower than that of the amorphous polyesters of comparable molecular weight which are commonly used in thermosetting powder compositions. This means that powder coating compositions based on semicrystalline polyesters exhibit better fluidity of the coating film in the molten state, giving final coatings free of orange-peel effects.

Furthermore, by virtue of the crystallinity of the polyesters, the powders formulated with a suitable crosslinking agent have very good storage stability. In addition, compared to amorphous polyesters, semicrystalline polyesters provide coatings having outstanding mechanical properties.

Thermosetting compositions containing semicrystalline polyesters have already formed the subject of a number of publications in the form of articles and patents. Thus, in PCT International Patent Application WO 91/14754, thermosetting powder coating compositions are described which comprise as binder a mixture of a crosslinking agent and of a polyester containing carboxyl groups, which mixture is composed of:

(a) from 5 to 100% by weight of a semicrystalline polyester containing carboxyl groups, having an acid number of from 10 to 70 mg of KOH/g and a hydroxyl number of less than 11 mg of KOH/g, and (b) from 0 to 95% by weight of an amorphous polyester containing carboxyl groups, having an acid number of from 15 to 90 mg of KOH/g.

The crosslinking agent may be a polyepoxy compound or a bis(β-hydroxyalkylamide).

According to the illustrative embodiments, these semicrystalline polyesters are prepared in one or two steps, from a major proportion of terephthalic acid or 1,4-cyclohexanedicarboxylic acid and a minor proportion of, on the one hand, adipic, succinic or 1,12-dodecane-dioc acid and, on the other hand, an aliphatic diol such as 1,6-hexanediol or 1,10-decanediol.

These semicrystalline polyesters possess a number-average molecular weight of between 1,600 and 12,000, one or more glass transition temperatures ($T_g$) below 55° C., a melting point of from 50° to 200° C. and a melt viscosity of from 100 to 7,000 mPa.s at 200° C. and from 4,000 to 20,000 mPa.s at 160° C. The constituents of the amorphous polyesters are the usual constituents well known in the art, for example terephthalic acid, isophthalic acid, adipic acid, neopentyl glycol, 1,6-hexanediol, trimethylolpropane, etc. Despite the low $T_g$ of the semicrystalline polyester, these powder compositions are storage stable and the thermall cured coatings have an improved appearance, are free of orange-peel effects and have superior mechanical properties, in particular excellent flexibility.

In PCT International Patent Application WO 94/02552, thermosetting powder coating compositions are described which comprise:

(a) a plasticizing semicrystalline polyester composed of linear aliphatic carboxylic diacids having from 4 to 22 carbon atoms, linear aliphatic diols having from 2 to 20 carbon atoms and, optionally, triols or triacids, this polyester having a melting point of from 40° C. to 200° C. and an acid or hydroxyl number of from 20 to 120; preferably, the polyester consists of more than 90 mol of 1,12-dodecanedioic acid per 100 mol of acids and of more than 90 mol of 1,6-hexanediol per 100 mol of polyols;

(b) a crosslinkable amorphous polyester; preferably, this polyester essentially consists of terephthalic acid and neopentyl glycol with a small amount of trimethylolpropane, and it possesses an acid or hydroxyl number of from 25 to 80;

(c) a crosslinking agent which, for polyesters containing carboxyl groups, is bis(N,N-dihydroxyethyl)adipamide or triglycidylisocyanurate.

By virtue of its plasticizing properties, the semicrystalline polyester present in the thermosetting powder composition which is described in this patent application makes it possible to obtain coatings having a better general appearance (gloss, surface evenness, absence of orange-peel effects) and better flexibility; furthermore, the storage stability of these compositions is not reduced by the presence of this semicrystalline polyester.

PCT International Patent Application WO 95/01407 relates to thermosetting powder composition for coatings comprising:

(a) an aliphatic semicrystalline polyester consisting of cyclohexanedicarboxylic acid and of diols having an even number of carbon atoms, ranging from 4 to 10; 1,4-butanediol is preferably used; this polyester possesses a melting temperature ranging from 60° C. to 160° C. and an acid or hydroxyl number of from 30 to 80;

(b) an aliphatic amorphous polyester consisting of cyclohexanedicarboxylic acid and a cycloaliphatic diol, for example 2,2,4,4-tetramethyl-1,3-cyclobutanediol or hydrogenated bisphenol A or alternatively 1,4-cyclohexanediol; this amorphous polyester possesses a glass transition temperature ranging from 50° C. to 70° C. and an acid or hydroxyl number for from 30 to 80;

(c) a crosslinking agent which, when the polyester contains carboxyl groups, may be triglycidylisocyanurate or a β-hydroxyalkylamide.

The presence of the semicrystalline polyester in the thermosetting powder compositions makes it possible to obtain coatings whose impact strength is improved, while good weatherability is maintained, according to this patent application.

Semicrystalline polyesters and the thermosetting powder compositions containing them therefore possess, overall, properties which are more advantageous than those of amorphous polymers used alone. However, despite their advantageous properties, the semicrystalline polyesters used in thermosetting powder compositions give coatings whose weatherability leaves something to be desired.

This is why the Applicant has conducted research work with the objective of finding thermosetting powder compositions giving paint or varnish coatings whose quality is at least equal to that of coatings obtained from compositions containing semicrystalline polyesters of the prior art with regard to reactivity, melt fluidity, flexibility, impact strength, surface evenness, etc., but which, in addition, are capable of providing particularly weather-resistant coatings.

The surprising discovery has now been made that this objective may be achieved when, for preparing the powder coating compositions, a mixture of semicrystalline polyesters containing carboxyl groups and of amorphous polyesters containing carboxyl groups is used, the semicrystalline polyester being essentially prepared at the start from 1,4-cyclohexanediol as alcoholic constituent and from a straight-chain saturated aliphatic dicarboxylic acid as acid constituent, the amorphous polyester being essentially prepared at the start from isophthalic acid as acid constituent and from neopentyl glycol and/or 2-butyl-2-ethyl-1,3-propanediol as alcoholic constituent.

This is why, in accordance with the present invention, novel thermosetting powder compositions are provided which comprise as binder a mixture of polyesters containing carboxylic groups and of a crosslinking agent having functional groups capable of reacting with the carboxyl groups, characterized in that the polyester comprise:

(a) a semicrystalline polyester containing carboxyl groups, which comprises, with respect to the total amount of alcohols, of from 85 to 100 mol % of 1,4-cyclohexanediol and of from 0 to 15 mol % of at least one other aliphatic and/or cycloaliphatic polyol and, with respect to the total amount of acids, of from 85 to 100 mol % of a straight-chain saturated dicarboxylic aliphatic acid having from 4 to 14 carbon atoms and of from 0 to 15 mol % of at least other aliphatic and/or cycloaliphatic and/or aromatic polycarboxylic acid; and (b) an amorphous polyester containing carboxyl groups, which comprises, with respect to the total amount of acids, of from 70 to 100 mol % of isophthalic acid and of from 0 to 30 mol % of at least one other aliphatic and/or cycloaliphatic and/or aromatic polycarboxylic acid and, with respect to the total amount of alcohols, of from 70 to 100 mol % of neopentyl glycol and/or of 2-butyl-2-ethyl-1,3-propanediol and of from 0 to 30 mol % of at least one other aliphatic and/or cycloaliphatic polyol.

The semicrystalline polyesters containing carboxyl groups present in the thermosetting compositions in accordance with the invention have an acid number of from 10 to 70 mg of KOH/g, preferably from 15 to 40 mg of KOH/g.

These semicrystalline polyesters containing carboxyl groups furthermore have the following characteristics:

- a number-average molecule weight of between 1600 and 17,000, preferably between 2800 and 11,200;
- a well-defined melting point of approximately from 60 to 140° C., determined by differential scanning calorimetry (or DSC) according to the standard ASTM D 3418, with a heating rate of 20° C./minute;
- a glass transition temperature ranging from −50 to 50° C. (DSC), according to the standard ASTM D 3418 with a heating rate of 30° C./minute; and
- a melt viscosity of from 5 to 10,000 mPa.s measured at 175° C. in a cone-and-plate viscometer, (known by the name "ICI viscosity"), according to the standard ASTM D 4287-88.

The acid constituent of the semicrystalline polyester used in the thermosetting compositions in accordance with the present invention contain from 85 to 100 mol % of a straight-chain saturated aliphatic dicarboxylic acid having from 4 to 14 carbon atoms. Examples of acids which may be used are succinic acid, glutaric acid, adipic acid, pimelic acid, suberic acid, azelaic acid, sebacic acid, etc. These acids may be used in the form of the free acid or of their functional derivaties, in particular in the form of anhydrides. Furthermore, these acids may be used as a mixture, but they are preferably used alone. Among these acids, adipic acid is preferably used.

The acid constituent of the semicrystalline polyester may also contain from 0 to 15 mol % of one or more other aliphatic and/or cycloaliphatic and/or aromatic polycarboxylic acids or the anhydrides thereof, for example 1,4-cyclohexanedicarboxylic acid, fumaric acid, maleic acid, trimellitic acid (or the anhydride) or pyromellitic acid.

The alcohol constituent of the semicrystalline polyester used in the thermosetting compositions in accordance with the present invention contain from 85% to 100 mol % of 1,4-cyclohexanediol. The alcoholic constituent of the polyester may furthermore contain from 0 to 15 mol % of aliphatic or cycloaliphatic polyols, such as ethylene glycol, propylene glycol, 1,4-butanediol, 1,6-hexanediol, 1,4-cyclohexanedimethanol, hydrogenated bisphenol A, trimethylolpropane, ditrimethylolpropane, trimethylolethane, pentaerythritol and mixtures thereof. It is preferable to use 1,4-cyclohexanediol alone as the alcoholic constituent.

The amorphous polyesters containing carboxyl groups present in the thermosetting compositions in accordance with the invention have an acid number of from 15 to 100 and preferably of from 30 to 70 mg of KOH/g.

These amorphous polyesters containing carboxyl groups furthermore have the following characteristics:

- a number-average molecular weight of between 1100 and 15,000, preferably between 1600 and 8500;
- a glass transition temperature (Tg) of from 40 to 80° C. (measured by DSC, like for the semicrystalline polyester);
- a melt viscosity of from 5 to 15,000 mPa.s measured at 200° C. in a cone-and-plate viscometer (known by the name "ICI viscosity") according to the standard ASTM D 4287-88.

The acid constituent of the amorphous polyester used in the thermosetting compositions in accordance with the present invention contain from 70 to 100 mol % of isophthalic acid, the remaining 0 to 30 mol % of acids consisting of one or more other aliphatic and/or cycloaliphatic and/or aromatic polycarboxylic acids, such as fumaric acid, maleic acid, terephthalic acid, phthalic acid, 1,2-, 1,3- or 1,4-cyclohexanedicarboxylic acids, succinic acid, glutaric acid, adipic acid, pimelic acid, suberic acid, azelaic acid, sebacic acid, etc., or the corresponding anhydrides thereof. The use of a polycarboxylic acid containing at least three carboxyl groups or the anhydride thereof, for example trimellitic acid (or the anydride) or pyromellitic acid, allows preparation of branched amorphous polyesters.

The alcohol constituent of the amorphous polyester used in the thermosetting compositions in accordance with the present invention contain from 70 to 100 mol % of neopentyl glycol or of 2-butyl-2-ethyl-1,3-propanediol, used alone or as a mixture. The remaining 0 to 30 mol % of alcohols consist of one or more other aliphatic and/or cycloaliphatic polyols chosen from ethylenes glycol, diethylene glycol, propylene glycol, 1,4-butanediol, 1,5-hexanediol, 1,4-cyclohexanedimethanol, 2-methyl-1,3-propanediol, hydrogenated bisphenol A and neopentyl glycol hydroxypivalate. For the preparation of branched amorphous polyesters, it is advantageous to use polyols containing three or four hydroxyl groups, such as trimethylolpropane, ditrimethylolpropane, trimethylolethane, pentaerythritol and mixtures thereof.

In the compositions in accordance with the invention, from 5 to 45, preferably from 10 to 30 parts by weight of the semicrystalline polyester containing carboxyl groups and from 55 to 95, preferably from 70 to 90 parts by weight of the amorphous polyester containing carboxylic groups, with respect to the total weight of these polyesters, are used.

An essential characteristic of the semicrystalline polyester containing carboxyl groups resides in the fact that the alcoholic constituent contains at least 85 mol % of 1,4-cyclohexanediol and that the acid constituent of the polyester includes at least 85 mol % of a straight-chain saturated aliphatic dicarboxylic acid having from 4 to 14 carbon atoms.

In fact, the surprising discovery has been made that a semicrystalline polyester having such a composition, when it is used with an amorphous polyester based on a major amount of isophthalic acid as acid constituent, and with a crosslinking agent, provides thermosetting powder compositions giving paint or varnish coatings possessing outstanding weatherability. In particular, the weatherability of the coatings obtained is markedly superior to that of the coatings obtained with the compositions prepared from the semicrystalline polyesters of the prior art which do not contain 1,4-cyclohexanediol. It is even surprising to observe that this weatherability is superior to that obtained with the commercially available amorphous polyesters containing carboxyl groups, which are used precisely because of their weatherability, such as polyesters based on isophthalic acid.

Moreover, the thermosetting powder compositions in accordance with the invention preserve all the above-mentioned advantages of the compositions containing semicrystalline polyesters—excellent storage stability and production of coatings with a smooth surface appearance having a high gloss and excellent mechanical properties which are preserved over time. It is obvious that in the powder paint industry, excellent weather-ability, combined with excellent mechanical properties imparted by the use of compositions in accordance with the invention are key factors of commercial importance.

The semicrystalline polyester containing carboxyl groups and the amorphous polyester containing carboxyl groups are prepared according to the conventional methods of synthesizing polyesters, using one-step or multi-step esterification. Preferably, the synthesis of the semicrystalline polyester is carried out in a single step. The amorphous polyester may be synthesized in one or two steps, depending on the monomers used.

For the preparation of the polyesters, a conventional reactor is used, this being equipped with a stirrer, an inert gas (nitrogen) inlet, a distillation column linked to a water-cooled condenser and a thermometer connected to a thermoregulator.

The esterification conditions used for the preparation of the polyesters are conventional, namely that a standard esterification catalyst derived from tin, such as dibutyltin oxide, dibutyltin dilaurate or n-butyltin trioctoate, or derived from titanium, such as tetrabutyl titanate, may be used in an amount of from 0 to 1% by weight of the reactants, and that optionally antioxidants, such as the phenolic compound IRGANOX 1010 (CIBA-GEIGY), or phosphonite-type and phosphite-type stabilizers, such as tributyl phosphite, may be added in an amount of from 0 to 1% by weight of the reactants.

The polyesterification is generally carried out at a temperature which is gradually increased from 130° C. to approximately 180 to 250° C., firstly under normal pressure, then under reduced pressure, these operating conditions being maintained until a polyester having the desired acid number is obtained. The degree of esterification is monitored by determining the amount of water formed in the course of the reaction and the properties of the polyester obtained, for example the acid number, the molecular weight or the viscosity.

When the polyesterification is completed, crosslinking catalysts are optionally added to the polyester still in the molten state, up to 1.5% by weight of the polyesters, for the purpose of accelerating the cross-linking of the thermosetting powder composition while it is curing.

In general, as catalyst, amine derivatives such as 2-phenylimidazoline, phosphines such as triphenylphosphine, quaternary ammonium salts such as tetrapropyl-ammonium chloride or tetrabutylammonium bromide, or phosphonium salts such as ethyltriphenylphosphonium bromide or benzyltriphenylphosphonium chloride, may be used.

The semicrystalline polyesters containing carboxyl groups and the amorphous polyesters containing carboxyl groups described hereinabove are intended to serve mainly as binders, in conjunction with crosslinking agents, in the preparation of thermosetting powder composition which can be used especially as varnishes and paints suitable for being applied using the technique of deposition by means of an elastrostatic or tribo-electric spray gun or using the technique of fluidized-bed deposition.

This is why the present invention also relates to the use of thermosetting powder compositions in accordance with the invention for the preparation of powder varnishes and paints, as well as to the powder varnishes and paints obtained using these compositions.

Finally, it also relates to a process for coating an article, preferably a metal article, which is characterized by application of a thermosetting powder composition in accordance with the invention to the said article by spray deposition using an electrostatic or tribo-electric gun or by fluidized-bed deposition followed by curing of the coating thus obtained at a temperature of from 150 to 220° C. for a time of from approximately 5 to 35 minutes.

The crosslinking agent used for the preparation of the thermosetting powder compositions in accordance with the invention is chosen from compounds containing functional groups capable of reacting with the carboxyl groups of the polyesters. Among these compounds, the following may be used as crosslinking agents:

polyepoxy compounds solid at room temperature and containing at least two epoxy groups per molecule such as, for example, triglycidyl isocyanurate (like the one marketed under the name Araldite PT 610 by CIBA-GEIGY) or the epoxy resin Araldite PT 910 (from the same company);

β-hydroxyalkylamides which contain at least one, preferably two bis (β-hydroxyalkyl)amide groups, for example those mentioned in PCT (International Patent Application WO 91/14745 and satisfying the general formula:

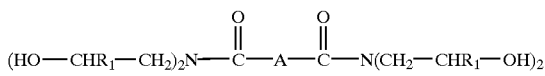

in which $R_1$ is H or an alkyl radical containing from 1 to 4 carbon atoms, and A represents an alkylene or aralkylene group containing from 2 to 20 carbon atoms, for example N,N,N', N'-tetrakis (2-hydroxyethyl) adipamide (Primid XL 552 from EMS);

acrylic copolymers containing gycidyl groups obtained from glycidyl methacrylate and/or glycidyl acrylate and a (meth)acrylic monomer and, optionally, an ethylenically mono-unsaturated monomer different from glycidyl (meth)acrylate or from the (meth)acrylic monomer. An example of this type of acrylic copolymer is GMA252 marketed by ESTRON CHEMICAL, Inc.

The crosslinking agent described hereinabove is used in an amount of from 0.25 to 1.4, preferably from 0.6 to 1.05 equivalent of carboxyl groups present in the semicrystalline polyester and the amorphous polyester, per equivalent of epoxy or β-hydroxyalkyl groups.

The thermosetting powder compositions in accordance with the invention may, for example, contain from 5 to 38.4 parts by weight of semicrystalline polyester, from 30 to 86.4 parts by weight of amorphous polyester and from 4 to 50 parts by weight of crosslinking agent with respect to the total weight of the polyesters and the crosslinking agent.

The thermosetting powder compositions in accordance with the invention may also contain various auxiliary substances used conventionally in the manufacture of powder paints and varnishes.

The auxiliary substances optionally added to the thermosetting compositions in accordance with the invention are, among others, ultraviolet-radiation-absorbing compounds such as Tinuvin 900 (from CIBA-GEIGY Corp.), light stabilizers based on sterically hindered amines (for example Tinuvin 144 from CIBA-GEIGY Corp.), other stabilizers such as Tinuvin 312 and 1130 (from CIBA-GEIGY), antioxidants (for example Irganox 1010 from CIBA-GEIGY) and phosphonite-type or phosphite-type stabilizers (for example Irgafos P-EPO from CIBA-GEIGY). The compositions in accordance with the invention may contain up to 10% by weight thereof with respect to the weight of the polyesters. A variety of mineral fillers and pigments may also be added to the thermosetting compositions in accordance with the invention. By way of examples of pigments and fillers, mention may be made of metal oxides such as titanium dioxide, iron oxide, zinc oxide, etc., metal hydroxides, metal powders, sulphides, sulphates, carbonates, silicates such as, for example, aluminum silicate, carbon black, talc, china clays, barytes, iron blues, lead blues, organic reds, organic maroons, etc. As auxiliary substances, mention may also be made of flow control agents such as Resiflow PV5 (from WORLEE) or Modaflow (from MONSANTO) or Acronal 4F (from BASF), plasticizers such as dicyclohexyl phthalate, triphenyl phosphate, auxiliary grinding aids, drying oils and degassing agents such as benzoin. These auxiliary substances are used in conventional amounts, it being understood that if the thermosetting compositions in accordance with the invention are used as varnishes, the addition of auxiliary substances having opacifying properties should be omitted.

In order to prepare the thermosetting powder compositions, the semicrystalline polyester, the amorphous polyester, the crosslinking agent and the various auxiliary substances used conventionally for the manufacture of powder paints and varnishes are dry-mixed, for example in a drum mixer. Next, this mixture is homogenized at a temperature lying within range from 80 to 150° C. in an extruder, for example a single-screw Buss-Ko-Kneader extruder or a twin-screw extruder of the Prism or A.P.V. type. Next, the extrudrate is allowed to cool, is ground, optionally cryogenically by means of liquid nitrogen, and sieved in order to obtain a powder whose particle size is between 10, and 150 micrometers.

Instead of the above method, it is also possible to mix the semicrystalline polyester, the amorphous polyester, the crosslinking agent and the auxiliary substances in a solvent such as dichloromethane, to grind it in order to obtain a homogeneous suspension and then to evaporate the solvent, for example by spray drying at a temperature of approximately 50° C., using methods known per se.

The powder paints and varnishes thus obtained are completely suitable for application on the article to be coated using the conventional techniques, that is to say using the well-known technique of fluidized-bed deposition or by application using an electrostatic or triboelectric spray gun. In the latter case, additives known to increase the ability to take a charge in triboelectric systems are added.

After having been applied to the article in question, the coatings deposited are cured by baking in an oven at a temperature of from 150 to 220° C. for a time of from approximately 5 to 35 minutes for the purpose of completely crosslinking the coating.

The examples which follows illustrate the invention, without limiting it. Unless indicated otherwise, the parts quoted in the examples are parts by weight.

EXAMPLE 1

One-Step Synthesis of an Amorphous Polyester Containing Carboxyl Groups 400.6 parts of neopentyl glycol and 22.3 parts of trimethylolpropane are introduced into a four-necked round-bottomed flask equipped with a stirrer, a distillation column linked to a water-cooled condenser, a nitrogen inlet tube and a thermometer connected to a thermo-regulator. The contents of the flask are heated under a stream of nitrogen with stirring to a temperature of approximately 130° C. and then added thereto are 724.7 parts of isophthalic acid and 2.5 parts of n-butyltin-trioctoate as catalyst, the mixture is heated in a nitrogen atmosphere with stirring to a temperature of approximately 230° C.; the water formed starts to distil off at about 180° C. When distillation under atmospheric pressure has ceased, a vacuum of 50 mm Hg is progressively established.

After heating the mixture at 230° C. under a vacuum of 50 mm of Hg for three hours it is cooled to 180° C., and then the polyester, while still in the molten state, is poured out of the flask and allowed to cool. The amorphous polyester containing carboxyl groups thus obtained has the following characteristics:

| | |
|---|---|
| acid number | 32 mg of KOH/g |
| hydroxyl number | 2 mg of KOH/g |
| ICI viscosity at 200° C. | 8,000 mPa.s |
| $T_g$ (DSC, 20° C./min) | 59° C. determined by differential scanning calorimetry (or DSC), with a heating rate of 20° C. per minute). |

EXAMPLE 2

Two-Step Synthesis of an Amorphous Polyester Containing Carboxyl Groups

Using the procedure Example 1, 400.5 parts of neopentyl glycol, 22.3 parts of trimethylolpropane, 468.5 parts of isophthalic acid, 145.0 parts of terephthalic acid, together with 2.4 parts of n-butyltin trioctoate as catalyst, are reacted. The polyester containing hydroxyl groups thus obtained has a hydroxyl number of 59 mg of KOH/g, an acid number of 12 mg of KOH/g and an ICI viscosity at 200° C. of 2,200 mPa.s.

The polyester containing hydroxyl groups obtained at step 1 is cooled to 200° C., 111.3 parts of isophthalic acid are added thereto and the mixture is heated to 230° C. After the reaction mixture has been heated at this temperature for 2 hours, and when it is transparent, a vacuum of 50 mm Hg is progressively established and heating under vacuum at the same temperature is continued for 3 hours. The amorphous polyester containing carboxyl groups obtained has the following characteristics:

| | |
|---|---|
| acid number | 31 mg of KOH/g |
| hydroxyl number | 3 mg of KOH/g |
| ICI viscosity at 200° C. | 8,600 mPa.s |
| $T_g$ (DSC, 20° C./min) | 61° C. |

EXAMPLE 3a

One-Step Synthesis of a Semicrystalline Polyester Containing Carboxyl Groups

A mixture of 500.0 parts of 1,4-cyclohexanediol, 655.1 parts of adipic acid and 2.5 parts of n-butyltin-trioctoate is placed in the same reactor as in Example 1. The reaction mixture is heated, with stirring and under nitrogen, to a temperature of approximately 140° C. at which point the reaction water starts to distil off. Heating is continued gradually to a temperature of 220° C. When distillation under atmospheric pressure ceases, 1.0 part of tributyl phosphite and 1.0 part of n-butyltin trioctoate are added to the reaction mixture, which is placed under a vacuum of 50 mm Hg. After five hours under this pressure at 220° C. the polyester obtained has the following characteristics:

| | |
|---|---|
| acid number | 23.5 mg of KOH/g |
| hydroxyl number | 2.5 mg of KOH/g |
| ICI viscosity at 175° C. | 3,600 mPa.s |
| ICI viscosity at 150° C. | 8,000 mPa.s |
| $T_g$ (DSC, 20° C./min) | 40° C. |
| melting temperature (DSC, 20° C./min) | 90 to 130° C. |

The semicrystalline polyester containing carboxyl groups is cooled to 160° C. and 5 parts of Tinuvin 144, 10 parts of Tinuvin 1130 and 10 parts of Tinuvin 312 are added thereto. After stirring for one hour the polyester contained in the flask is recovered.

EXAMPLE 3b

One-Step Synthesis of a Semicrystalline Polyester Containing Carboxyl Groups

A mixture of 400.2 parts of 1,4-cyclohexanediol, 133.4 parts of hydrogenated bisphenol A, 610.6 parts of adipic acid and 2.5 parts of n-butyltin trioctoate is placed in the same reactor as in Example 1. The reaction mixture is heated with stirring and under nitrogen to a temperature of approximately 140° C., at which point the reaction water starts to distil off. Heating is continued gradually, to a temperature of 220° C. When distilled under atmospheric pressure ceases, 1.0 part of tributyl phosphite and 1.0 part of n-butyltin trioctoate are added to the reaction mixture, which is placed under a vacuum of 50 mm Hg. After five hours under this pressure at 220° C., the polyester obtained has the following characteristics:

| | |
|---|---|
| acid number | 21.4 mg of KOH/g |
| hydroxyl number | 2.8 mg of KOH/g |
| ICI viscosity at 175° C. | 4,300 mPa.s |
| $T_g$ (DSC, 20° C./min) | 42° C. |
| melting temperature (DSC, 20° C./min) | 95 to 115° C. |

The semicrystalline polyester containing carboxyl groups is cooled to 160° C. and 10 parts of Tinuvin 144 and 20 parts of Tinuvin 900 are added thereto. After stirring for one hour, the polyester contained in the flask is recovered.

EXAMPLES 4 TO 9

Synthesis of Amorphous Polyesters and Semicrystalline Polyesters Containing Carboxyl Groups Preparation of 6 other amorphous or semicrystalline polyesters was carried out. The amorphous polyesters of Examples 4 to 7 were prepared using the procedure of Example 1 and the semicrystalline polyesters of Examples 8 and 9 were prepared using the procedure of Example 3. Table I below indicates the nature and quantities of the initial materials used, the acid number ($I_{AC}$), the hydroxyl number ($I_{OH}$), the ICI viscosity at the temperature indicated, the glass transition temperature ($T_g$) measured by differential scanning calorimetry (or DSC, 20° C./min) and the melting temperature ($T_m$), also measured by differential scanning calorimetry (DSC, 20° C./min).

In Table I, the various compounds used for preparation of the polyesters are denoted by the following abbreviations:
CHDO: 1,4-cyclohexanediol
TMP: trimethylolpropane
NPG: neopentyl glycol
BEPD: 2-butyl-2-ethyl-1,3-propanediol
NHP: neopentyl glycol hydroxypivalate
ADA: adipic acid
IPA: isophthalic acid

TABLE I

| | amorphous polyesters | | | | semicrystalline polyesters | |
|---|---|---|---|---|---|---|
| | 4 | 5 | 6 | 7 | 8 | 9 |
| IPA | 724.3 | 735.4 | 601.3 | 687.4 | | |
| NPG | 421.6 | 368.2 | | 322.3 | | |
| BEPD | | | 497 | | | |
| NHP | | | | 107.4 | | |
| TMP | | 39.9 | 22.3 | 22.3 | | 39.4 |
| CHDO | | | | | 493.3 | 429.8 |
| ADA | | | | | 659.7 | 669.6 |
| $I_{AC}$ (mg of KOH/g) | 32 | 49 | 34 | 32 | 32 | 53 |
| $I_{OH}$ (mg of KOH/g) | 2 | 3 | 2 | 3 | 3 | 4 |
| ICI Viscosity (mPa.s) | 2100 (200° C.) | 5500 (200° C.) | 2200 (200° C.) | 3800 (200° C.) | 1500 (175° C.) | 2500 (175° C.) |
| Tg (° C.) | 52 | 55 | 51 | 53 | 33 | 28 |
| Tm (° C.) | | | | | 90–130 | 100–130 |

EXAMPLE 10 (COMPARATIVE)

Two-step Synthesis of an Amorphous Polyester Containing Carboxyl Groups 421.6 parts of neopentyl glycol are placed in the same reactor as in Example 1, and heated to a temperature of 130° C. 606.1 parts of terephthalic acid and 2.5 parts of n-butyltin trioctoate are then added to the reactor. The reaction is continued at 240° C., under atmospheric pressure, until the moment when 95% of the theoretical amount of reaction water has distilled off and when the polyester obtained is transparent. A polyester containing hydroxyl group is thus obtained which has the following characteristics:

| | |
|---|---|
| acid number | 8 mg of KOH/g |
| hydroxyl number | 16 mg of KOH/g |
| ICI viscosity at 200° C. | 1,200 mPa.s. |

118.3 parts of isophthalic acid are added to the polyester obtained at the first step, which is at 200° C. Next, the reaction mixture is heated to 230° C., and maintained at 240° C. for three hours. When the reaction mixture is transparent, it is placed under a vacuum of 50 mm Hg and maintained at 240° C. for four hours under this pressure. An amorphous polyester containing carboxyl groups is thus obtained which has the following characteristics:

| | |
|---|---|
| acid number | 33 mg of KOH/g |
| hydroxyl number | 3 mg of KOH/g |
| ICI viscosity at 200° C. | 4,700 mPa.s |
| $T_g$ (DSC, 20° C./min) | 57° C. |

The polyester is cooled to 200° C. and 1.3 parts of ethyltriphenylphosphonium bromide are added thereto. After stirring for one hour, the polyester is recovered.

This amorphous polyester containing carboxyl groups, used by way of comparison, is well known in the prior art. With respect to the combination of acids from which it is made up, the polyester contains a majority of terephthalic acid and a minority of isophthalic acid; in contrast, the amorphous polyesters containing carboxyl groups used in the thermosetting powder compositions according to the present invention, contain a majority of isophthalic acid (at least 70 mol % with respect to the total amount of acids).

EXAMPLE 11 (COMPARATIVE)

Two-Step Synthesis of a Semicrystalline Polyester Containing Carboxyl Groups

The same reactor as in Example 1 is charged with 459.4 parts of 1,6-hexanediol, which are heated to 150° C. 579.5 parts of terephthalic acid and 2.5 parts of n-butyltin trioctoate are then added. The reaction is continued at 236° C. under atmospheric pressure, until 95% of the theoretical amount of reaction water has been distilled off. A polyester containing hydroxyl groups is thus obtained which has the following characteristics:

| | |
|---|---|
| acid number | 5 mg of KOH/g |
| hydroxyl number | 53 mg of KOH/g |
| ICI viscosity at 175° C. | 800 mPa.s. |

101.3 parts of adipic acid are added to the polyester obtained at the first step, maintained at 200° C. The reaction mixture is then heated to 235° C. After two hours at this temperature, 1.0 part of tributyl phosphite is added to the reaction mixture which is placed under a vacuum of 50 mm Hg. Two hours later at the same temperature, a semicrystalline polyester containing carboxyl groups is obtained which has the following characteristics:

| | |
|---|---|
| acid number | 32 mg of KOH/g |
| hydroxyl number | 0.5 mg of KOH/g |
| ICI viscosity at 200° C. | 1,500 mPa.s. |
| $T_g$ (DSC: 20° C./min) | 28° C. |
| $T_m$ (DSC: 20° C./min) | 131° C. |

The polyester is cooled to 160° C. and 5 parts of Tinuvin 144. 10 parts of Tinuvin 1130 and 10 parts of Tinuvin 312 are added thereto. After stirring for one hour, the polyester is isolated.

This semicrystalline polyester containing carboxyl groups, used by way of comparison, is known in the prior art, for example from PCT Patent Application WO 91/14745. Contrary to the crystalline polyesters used in the thermosetting powder compositions according to the present invention, in which the diol employed in greatly preponderant amount is 1,4-cyclohexanediol, the semicrystalline polyesters described in this patent application do not contain the latter compound.

EXAMPLE 12 (COMPARATIVE)

One-step Synthesis of a Semi-Crystalline Polyester Containing Carboxyl Groups

Example 3a is repeated exactly, but the 500.0 parts of 1,4-cyclohexanediol are replaced by 552.3 parts of 1,4-cyclohexanedimethanol, and 587.7 parts of adipic acid are used instead of 655.1 parts. At the end of condensation, the same amounts of the same Tinuvin compounds as in Example 3a are added. A semicrystalline polyester is obtained which has the following characteristics:

| | |
|---|---|
| acid number | 23.0 mg of KOH/g |
| hydroxyl number | 3 mg of KOH/g |
| ICI viscosity at 175° C. | 1,600 mPa.s. |
| $T_g$ (DSC: 20° C./min) | 40° C. |
| melting temperature (DSC: 20° C./min) | 80 to 100° C. |

EXAMPLE 13 (COMPARATIVE)

One-Step Synthesis of a Semi-Crystalline Polyester Containing Carboxyl Groups 386.1 parts of 1,4-butanediol are put in to the same reactor as in Example 1, and heated to approximately 130° C. with stirring and under a stream of nitrogen. 768.3 parts of 1,4-cyclohexanedicarboxylic acid and 2.5 parts of n-butyltin trioctoate are then added. The mixture is gradually heated to a temperature of 220° C. When distillation under atmospheric pressure has ceased, 1.0 part of tributyl phosphite is added and placed under a vacuum of 50 mm Hg. After four hours under this pressure at 220° C. the polyester obtained has the following characteristics:

| | |
|---|---|
| acid number | 21.0 mg of KOH/g |
| hydroxyl number | 3 mg of KOH/g |
| ICI viscosity at 175° C. | 2,400 mPa.s. |
| $T_g$ (DSC, 20° C./min) | −10° C. |
| melting temperature (DSC: 20° C./min) | 35 to 45° C. |

The semicrystalline polyester containing carboxyl groups is cooled and the same amounts of the same Tinuvin compounds as in Example 3a are added.

EXAMPLE 14

Preparation of Thermosetting Powder Compositions

A series of powders which can be used for producing coatings is prepared from the polyesters obtained in Examples 1 to 13, according to the following two different formulations, one having a white colour (RAL 9010) (formulation A) and the other having a dark brown colour (RAL 8014) (formulation B):

| | | |
|---|---|---|
| A) Binder | 600.0 | parts |
| Titanium dioxide[1] | 300.0 | parts |
| Blanc Fix F[2] | 100.0 | parts |
| Flow control agent[3] | 10.0 | parts |
| Benzoin | 3.5 | parts |
| B) Binder | 804.0 | parts |
| Bayferrox 130[4] | 45.0 | parts |
| Bayferrox 3950[4] | 140.0 | parts |
| FW 2[5] | 11.0 | parts |
| Flow control agent[3] | 10.0 | parts |
| Benzoin | 3.5 | parts |

[1]Kronos 2310 (KRONOS)
[2](SACHTLEBEN)
[3]Resiflow PV5 (WORLEE)
[4](BAYER)
[5](DEGUSSA).

The binder for these formulations always contains the crosslinking agent, as well as either a mixture of amorphous polyester and semicrystalline polyester according to the invention (Compositions 14 to 26) or, for comparison, an amorphous polyester by itself or as a mixture with a comparative semicrystalline polyester (Compositions 27 to 36), as indicated in Table II.

The crosslinking agent is triglycidyliso-cyanurate for Compositions 14 to 24 and 27 to 36, while β-hydroxyalkylamide is used for Composition 25 and an epoxy compound for Composition 26.

For preparation of the powder compositions containing an amorphous polyester and a semicrystalline polyester, the two polyesters are firstly mixed, either in the molten state in a conventional round-bottomed flask until the mixture is homogenous, or by using an extruder, for example of the Betol BTS 40 type (from EIS Group plc).

Next, the powders are prepared by dry mixing the mixture of polyesters (or the polyester alone for Comparative Composition 27, 28, 31 and 32) and the crosslinking agent with the various auxiliary substances conventionally used for manufacturing powder paints and varnishes. The mixture is homogenized and extruded at a temperature of 85° C. in a twin-screw extruder, of the Prism 16 mm L/D 15/1 type (from PRISM). The extrudate is cooled and ground in a mill, such as the Retsch ZM1 (from RETSCH). Finally, the powder is sieved to obtain a particle size of between 10 and 110 micrometres.

The various temperature thermosetting powder compositions thus prepared are reported in Table II.

In this table:

the 1st column gives the number of the composition prepared;

the 2nd column gives the type of information used, A or B;

the 3rd column gives the number of the example of preparation of the amorphous polyester containing carboxyl groups used in the composition prepared;

the 4the column gives the amount of polyester used, in parts by weight, this polyester referring to Column 3;

the 5the column gives the number of the example of preparation of the semicrystalline polyester containing carboxyl groups which is used in the composition prepared;

the 6the column gives the amount of semicrystalline polyester used, in parts by weight, this polyester referring to Column 5;

the 7the column gives the amount of ethyltriphenyl-phosphonium bromide optionally used as accelerator, in parts by weight;

the 8the column gives the amount of crosslinking agent used, in parts by weight.

TABLE II

| No. | Formulation type | Amorphous polyester | | Semicrystalline polyester | | Accelerator | Crosslinking agent |
|---|---|---|---|---|---|---|---|
| | | Ex. No. | Amount | Ex. No. | Amount | | |
| 14 | A | 1 | 390.6 | 8 | 167.4 | — | 42.0[(2)] |
| 15 | A | 1 | 448.8 | 3a | 112.2 | — | 39.0[(2)] |
| 16 | A | 1 | 456.1 | 3a | 104 | 1.0 | 39.0[(2)] |
| 17 | A | 2 | 446.4 | 8 | 110.2 | 1.4 | 42.0[(2)] |
| 18 | A | 4 | 446.4 | 8 | 110.2 | 1.4 | 42.0[(2)] |
| 19 | A | 5 | 434.9 | 8 | 108.7 | — | 56.4[(2)] |
| 20a | A | 5 | 437.8 | 3a | 109.4 | — | 52.8[(2)] |
| 20b | A | 5 | 465.1 | 3b | 82.1 | — | 52.8[(2)] |
| 21 | A | 5 | 432.0 | 9 | 108.0 | — | 60.0[(2)] |
| 22 | A | 6 | 448.8 | 3a | 112.2 | — | 39.0[(2)] |
| 23 | A | 7 | 476.1 | 3a | 84.0 | — | 39.0[(2)] |
| 24 | B | 1 | 523.4 | 3a | 224.3 | 1.0 | 56.3[(2)] |
| 25 | B | 1 | 645.2 | 3a | 113.8 | — | 45.0[(3)] |
| 26 | B | 1 | 623.9 | 3a | 110.1 | — | 70.0[(4)] |
| 27[(1)] | A | 10 | 558.8 | — | — | — | 42.0[(2)] |
| 28[(1)] | B | 10 | 747.7 | — | — | — | 56.3[(2)] |

TABLE II-continued

| No. | Formulation type | Amorphous polyester Ex. No. | Amount | Semicrystalline polyester Ex. No. | Amount | Accelerator | Crosslinking agent |
|---|---|---|---|---|---|---|---|
| 29[1] | B | 1 | 523.4 | 11 | 224.3 | — | 56.3[2] |
| 30[1] | B | 1 | 635.6 | 11 | 112.2 | — | 56.3[2] |
| 31[1] | A | 1 | 558.0 | — | — | — | 42.0[2] |
| 32[1] | B | 1 | 747.7 | — | — | — | 56.3[2] |
| 33[1] | A | 1 | 476.1 | 12 | 84 | 1.0 | 39.0[2] |
| 34[1] | A | 1 | 476.1 | 13 | 84 | 1.0 | 39.0[2] |
| 35[1] | B | 1 | 635.6 | 12 | 112.2 | 1.0 | 56.3[2] |
| 36[1] | B | 1 | 635.6 | 13 | 112.2 | 1.0 | 56.3[2] |

[1]Compositions prepared by way of comparison
[2]triglycidyl isocyanurate (Araldite PT 810 from CIBA-GEIGY)
[3]β-hydroxyalkylamide (Primid X2 552 from EMS)
[4]epoxy resin (Araldite PT 910 from CIBA-GEIGY)

EXAMPLE 15

Characteristics of the Paint Coatings

The powders, formulated as described in Example 14, are applied using a GEMA-Volstatic PCG1 electrostatic spray gun, at a voltage of 60 kV, to untreated cold-rolled steel panels with a film thickness of from 50 to 80 micrometres. The coatings deposited are then cured in an air-ventilated oven, at a temperature of 200° C., for a period of 15 minutes. The cured coatings thus obtained are subjected to conventional tests. The results obtained are reported in Table IV. In this table:

the 1st column gives the number of the composition prepared according to Example 14;

the 2nd column gives the gloss value at an angle of 60°, in %, according to standard ASTM D 523;

the 3rd column gives the pencil hardness by means of a Scratch Hardness Tester according to Wolff Wilborn;

the 4th column gives the behavior (flexibility) of the coating to bending over a 3 mm conical mandrel, according to standard ASTM D 522;

the 5the column gives the value obtained in the Erichsen indentation test, according to standard ISO 1520;

the 6the column gives the value of the reverse-impact resistance, in kg.cm, according to standard ASTM D 2794; and the 7the column gives the value of the direct-impact resistance, in kg.cm, according to standard ASTM D 2794.

TABLE III

| Composition No. | Gloss at 60° (%) | Pencil hardness | Conical mandrel | Erichsen indentation (mm) | Reverse impact (kg.cm) | Direct impact (kg.cm) |
|---|---|---|---|---|---|---|
| 14 | 86 | 2H | passes | 10.7 | 200 | 200 |
| 15 | 90 | H | passes | 10.1 | 160 | 120 |
| 16 | 90 | H | passes | 10.3 | 180 | 180 |
| 17 | 92 | H | passes | 10.2 | 180 | 180 |
| 18 | 98 | H | passes | 10.4 | 180 | 180 |
| 19 | 85 | 2H | passes | 10.8 | 200 | 200 |
| 20a | 86 | H | passes | 10.5 | 160 | 160 |
| 20b | 92 | 2H | passes | 10.7 | 200 | 200 |
| 21 | 89 | 2H | passes | 10.4 | 180 | 160 |
| 22 | 93 | H | passes | 10.3 | 160 | 140 |
| 23 | 92 | H | passes | 10.5 | 180 | 180 |
| 24 | 93 | H | passes | 10.1 | 160 | 160 |
| 25 | 96 | H | passes | 10.8 | 180 | 200 |
| 26 | 97 | H | passes | 10.2 | 160 | 180 |
| 27[1] | 93 | H | passes | 10.2 | 180 | 180 |
| 28[1] | 91 | H | passes | 10.5 | 200 | 200 |
| 29[1] | 93 | H | passes | 6.2 | <10 | <10 |
| 30[1] | 93 | H | passes | 9.4 | 60 | 40 |
| 31[1] | 92 | H | passes | 5.4 | <10 | <10 |
| 32[1] | 90 | H | passes | 6.8 | <10 | — |
| 33[1] | 94 | H | passes | 7.9 | 0 | 20 |
| 34[1] | 95 | H | passes | 8.3 | 0 | 20 |
| 35[1] | 92 | H | passes | 8.0 | 0 | 20 |
| 36[1] | 96 | H | passes | 8.2 | 0 | 20 |

[1]compositions used by way of comparison.

These results clearly show that the powder compositions, based on a mixture of amorphous polyesters and semicrystalline polyesters, in according with the invention (No. 14 to 26), give paint and varnish coatings having advantageous characteristics which are quite comparable to those of corresponding coatings obtained from compositions of the prior art based on amorphous polyesters in which the terephthalic acid content is high (No. 27 and 28), the coatings having a very high gloss and excellent mechanical properties.

In contrast, the compositions containing only an amorphous polyester, in which the isophthalic acid content is high (No. 31 and 32), give coatings with medicare mechanical properties. Adding semicrystalline polyesters known in the prior art to these amorphous polyesters, the isophthalic acid content of which is high, does not enable satisfactory mechanical properties to be achieved (No. 29, 30 and 33 to 36).

EXAMPLE 16

Weatherability of the Paint Coatings

In this example, the weatherability of paint coatings obtained with the mixture of amorphous polyester and semicrystalline polyester of Compositions 24 to 26 in accordance with the invention is compared with that of coatings obtained with Compositions 28, 30, 35 and 36, which are not in accordance with the invention.

The pigmented powders formulated as described in Example 14 are applied, using an electrostatic gun, to chromace-treated aluminum panels under the same conditions as in Example 15.

The coatings were subjected to an accelerated ageing test so as to estimate the weatherability thereof (Q-UV test).

The weatherability measurement were carried out in a very severe environment, that is to say be means of a Q-UV apparatus for measuring accelerated ageing (from Q Panel Co.) in which the coatings are subjected to the intermittent effects of condensation (4 hours at 40° C.) as well as to simulated effects of light-induced deterioration produced by fluorescent UV lamps (lamps: UVA 340 nm; I=0.77 W/m²/nm) for 8 hours at 60° C., according to standard ASTM G 53-88. With this type of lamp, good correlation with the effects of natural sunlight is observed, which is not the case with UVB lamps emitting mainly at a wavelength of 313 nm.

Table IV gives the gloss values for the paint coatings, these being measured, at an angle of 50° according to standard ASTM D 523, every 200 hours.

TABLE IV

Variation in the 60° gloss (%) over time

Number of the composition according to Example 14

| Hours | 24 | 25 | 26 | 28 | 30 | 32 | 35 | 36 |
|---|---|---|---|---|---|---|---|---|
| 000 | 100 | 100 | 100 | 100 | 100 | 100 | 100 | 100 |
| 200 | 100 | 100 | 100 | 99 | 99 | 100 | 99 | 99 |
| 400 | 100 | 100 | 100 | 99 | 99 | 100 | 98 | 98 |
| 600 | 100 | 100 | 100 | 97 | 99 | 99 | 99 | 97 |
| 800 | 100 | 100 | 100 | 96 | 98 | 100 | 98 | 98 |
| 1000 | 100 | 100 | 100 | 95 | 98 | 97 | 98 | 96 |
| 1200 | 100 | 100 | 100 | 95 | 98 | 97 | 97 | 97 |
| 1400 | 100 | 100 | 100 | 87 | 95 | 97 | 95 | 95 |
| 1600 | 100 | 100 | 100 | 80 | 93 | 97 | 90 | 94 |
| 1800 | 100 | 100 | 100 | 78 | 86 | 97 | 85 | 89 |
| 2000 | 100 | 100 | 100 | 74 | 81 | 97 | 81 | 96 |
| 2200 | 100 | 100 | 100 | 60 | 79 | 96 | 77 | 83 |
| 2400 | 100 | 100 | 100 | 42 | 68 | 96 | 66 | 79 |
| 2600 | 100 | 100 | 100 |  | 65 | 95 | 63 | 73 |
| 2800 | 100 | 100 | 100 |  | 57 | 95 | 62 | 60 |
| 3000 | 100 | 100 | 100 |  | 42 | 93 | 55 | 51 |
| 3200 | 100 | 100 | 100 |  |  | 92 | 40 | 39 |
| 3400 | 100 | 100 | 100 |  |  | 91 |  |  |
| 3600 | 100 | 100 | 100 |  |  | 89 |  |  |
| 3800 | 99 | 99 | 100 |  |  | 87 |  |  |
| 4000 | 100 | 100 | 99 |  |  | 87 |  |  |
| 4200 | 98 | 98 | 99 |  |  | 86 |  |  |
| 4400 | 98 | 98 | 98 |  |  | 84 |  |  |
| 4600 | 97 | 97 | 98 |  |  | 83 |  |  |
| 4800 | 97 | 97 | 97 |  |  | 79 |  |  |
| 5000 | 96 | 96 | 95 |  |  | 77 |  |  |
| 5200 | 96 | 97 | 96 |  |  | 76 |  |  |
| 5400 | 95 | 95 | 94 |  |  | 75 |  |  |
| 5600 | 95 | 94 | 95 |  |  | 73 |  |  |
| 5800 | 94 | 94 | 93 |  |  | 69 |  |  |
| 6000 | 94 | 93 | 92 |  |  | 67 |  |  |
| 6200 | 92 | 92 | 92 |  |  | 63 |  |  |
| 6400 | 90 | 90 | 90 |  |  | 59 |  |  |
| 6600 | 90 | 89 | 88 |  |  | 58 |  |  |
| 6800 | 88 | 88 | 87 |  |  | 54 |  |  |
| 7000 | 88 | 87 | 87 |  |  | 50 |  |  |
| 7200 | 87 | 86 | 85 |  |  | 49 |  |  |
| 7400 | 86 | 86 | 85 |  |  | 48 |  |  |
| 7600 | 85 | 85 | 84 |  |  |  |  |  |
| 7800 | 84 | 83 | 84 |  |  |  |  |  |
| 8000 | 82 | 83 | 82 |  |  |  |  |  |
| 8200 | 80 | 79 | 79 |  |  |  |  |  |
| 8400 | 79 | 79 | 77 |  |  |  |  |  |
| 8600 | 79 | 78 | 77 |  |  |  |  |  |
| 8800 | 78 | 76 | 74 |  |  |  |  |  |
| 9000 | 76 | 75 | 74 |  |  |  |  |  |
| 9200 | 75 | 75 | 72 |  |  |  |  |  |
| 9400 | 74 | 74 | 72 |  |  |  |  |  |
| 9600 | 70 | 71 | 69 |  |  |  |  |  |
| 9800 | 69 | 70 | 69 |  |  |  |  |  |
| 10000 | 68 | 67 | 67 |  |  |  |  |  |
| 10200 | 65 | 66 | 66 |  |  |  |  |  |
| 10400 | 62 | 64 | 63 |  |  |  |  |  |
| 10600 | 60 | 61 | 59 |  |  |  |  |  |
| 10800 | 59 | 60 | 58 |  |  |  |  |  |
| 11000 | 58 | 57 | 54 |  |  |  |  |  |
| 11200 | 55 | 55 | 50 |  |  |  |  |  |
| 11400 | 53 | 51 | 48 |  |  |  |  |  |
| 11600 | 50 | 46 | 44 |  |  |  |  |  |
| 11800 | 49 | 40 | 39 |  |  |  |  |  |
| 12000 | 47 | 37 | 35 |  |  |  |  |  |

The results in Table IV show that the compositions in accordance with the invention, based on a mixture of an amorphous polyester having a high isophthalic acid content and of a semicrystalline polyester, which contains a preponderant amount of 1,4-cyclohexanediol as alcoholic constituent, provide coatings which resist weathering remarkably well over time, contrary to the polyester-based compositions of the prior art.

Thus, it may be seen that the coatings prepared from Compositions 24 to 26 retain close to 100% of their gloss after 4000 hours, and even 50% after 11,200 to 11,600 hours.

On the other hand, for the coatings prepared from the compositions of the prior art, the initial gloss decreases much more rapidly over time.

Thus, the gloss of the coating prepared from Composition 32 is merely 50% of its initial value after only 7000 hours. Yet this is an amorphous polyester with a high isophthalic acid content, which polyester is highly esteemed for its performance when exposed to the outside.

The results are even poorer with Composition 28, which contains an amorphous polyester having a high terephthalic acid content the gloss is only 50% of its initial value after bearly approximately 2300 hours.

It is also observed that adding semicrystalline polyesters of the prior art to an amorphous polyester having a high isophthalic acid content causes the weatherability properties of this amorphous polyester to deteriorate. This is the case for Compositions 30, 35 and 36. The coating obtained from Composition 30, which contains the semicrystalline polyester of Example 11, essentially based on terephthalic acid, as a mixture with the amorphous polyester having a high isophthalic acid content of Example 1, already has its gloss reduced to 50% of its initial value after 2900 hours. With regard to the coatings obtained from Compositions 35 and 36, which contain, beside the amorphous polyester of Example 1, the entirely aliphatic semicrystalline polyesters of Examples 12 and 13 respectively, these lose 50% of their initial gloss after approximately 3000 hours. It may therefore be seen that adding a semicrystalline polyester having a high 1,4-cyclohexanediol content to an amorphous polyester having a high isophthalic acid content gives compositions providing coatings which exhibit both outstanding weatherability and excellent mechanical properties, which are maintained over time.

What is claimed is:

1. Thermosetting powder compositions comprising a binder a mixture of polyesters containing carboxyl groups and of a crosslinking agent having functional groups capable of reacting with the carboxyl groups, wherein the polyesters comprise:
    (a) from 5 to 45 parts by weight, calculated on the total of polyesters, of a semicrystalline polyester containing carboxyl groups, which comprises, with respect to the total amount of alcohols, of from 85 to 100 mol % of 1,4-cyclohexanediol and of from 0 to 15 mol % of at least one other aliphatic and/or cycloaliphatic polyol and, with respect to the total amount of acids, of from 85 to 100 mol % of a straight-chain saturated di-carboxylic aliphatic acid having from 4 to 14 carbon atoms and of from 0 to 15 mol % of at least one other aliphatic and/or cycloaliphatic and/or aromatic polycarboxylic acid, this semicrystalline polyester having an acid number of from 10 to 70 mg of KOH/g, a number average molecular weight of from 1600 to 17000 and a melting temperature of from 60 to 140° C. and a glass transition temperature ranging from –50 to 50° C.; and
    (b) from 95 to 55 parts by weight, calculated on the total of polyesters, of an amorphous polyester containing carboxyl groups, which comprises, with respect to the total amount of acids, of from 70 to 100 mol % of isophthalic acid and of from 0 to 30 mol % of at least one other aliphatic and/or cycloaliphatic and/or aromatic polycarboxylic acid and, with respect to the total amount of alcohols, of from 70 to 100 mol % of neopentyl glycol and/or of 2-butyl-2-ethyl-1,3-propanediol and of from 0 to 30 mol % of at least other aliphatic and/or cycloaliphatic polyol, this amorphous polyester having an acid number of from 15 to 100 mg of KOH/g and a number average molecular weight of from 1100 to 11500.

2. Compositions according to claim 1, wherein the straight-chain saturated aliphatic dicarboxylic acid present in the composition of the semicrystalline polyester (a) is selected from the group consisting of succinic acid, glutaric acid, adipic acid, pimelic acid, suberic acid, azelaic acid, sebacic acid and the anhydrides thereof, alone or as a mixture.

3. Compositions according to claim 1, wherein the polycarboxylic acid present in the composition of the semicrystalline polyester (a) is selected from the group consisting of 1,4-cyclohexanedicarboxylic acid, fumaric acid, maleic acid, trimellitic acid, pyromellitic acid and the anhydrides thereof, alone or as a mixture.

4. Compositions according to claim 1, wherein the polyol present in the composition of the semicrystalline polyester (a) is selected from the group consisting of ethylene glycol, propylene glycol, 1,4-butanediol, 1,6-hexanediol, 1,4-cyclohexanedimethanol, hydrogenated bisphenol A, trimethylolpropane, ditrimethylolpropane, trimethylolethane, pentaerythritol and the mixtures thereof.

5. Compositions according to claim 1, wherein the semicrystalline polyester (a) has an acid number of between 15 and 40 mg of KOH/g.

6. Compositions according to claim 1, wherein the semicrystalline polyester (a) possesses a number-average molecular weight of between 2800 and 11,200.

7. Compositions according to claim 1, wherein the semicrystalline polyester (a) has a melt viscosity of from 5 to 10,000 mPa.s measured at 175° C. with a cone-and-plate viscometer.

8. Compositions according to claim 1, wherein the polycarboxylic acid present in the composition of the amorphous polyester (b) is selected from the group consisting of maleic acid, fumaric acid, o-phthalic acid, terephthalic acid, 1,2-cyclohexanedicarboxylic acid, 1,3-cyclohexanedicarboxylic acid, 1,4-cyclohexanedicarboxylic acid, succinic acid, glutaric acid, adipic acid, pimelic acid, suberic acid, azelaic acid, sebacic acid, trimellitic acid, pyromellitic acid and the anhydrides thereof, alone or as a mixture.

9. Compositions according to claim 1, wherein the polyol present in the composition of the amorphous polyester (b) is selected from the group consisting of ethylene glyucol, diethylene glycol, propylene glycol, 1,4-butanediol, 1,6-hexanediol, 1,4-cyclohexanedimethanol, 2-methyl-1,3-propanediol, hydrogenated bisphenol A, neopentyl glycol hydroxypivalate, trimethylolpropane, ditrimethylolpropane, trimethylolethane, pentaerythritol and mixtures thereof.

10. Compositions according to claim 1, wherein the amorphous polyester (b) has an acid number of from 30 to 70 mg of KOH/g.

11. Compositions according to claim 1, wherein the amorphous polyester (b) possesses a number-average molecular weight of between 1,600 and 8,500.

12. Compositions according to claim 1, wherein the amorphous polyester (b) has a melt viscosity from 5 to 15,000 mPa.s measured at 200° C. with a cone-and-plate viscometer.

13. Compositions according to claim 1, wherein the amorphous polyester (b) has a glass transition temperature of approximately 40 to 80° C.

14. Compositions according to claim 1, wherein the mixture of polyesters contains from 10 to 30 parts by weight of the semicrystalline polyester containing carboxylic groups (a) and from 70 to 90 parts by weight of the amorphous polyester (b), with respect to the total weight of the polyesters.

15. Compositions according to claim 1, wherein crosslinking agent is a polyepoxy compound.

16. Compositions according to claim 15, wherein the polyepoxy compositions is triglycidylisocyanurate.

17. Compositions according to any one claim 1, wherein the crosslinking agent is a β-hydroxyalkylamide.

18. Compositions according to claim 15, wherein the crosslinking agent is acrylic copolymer containing glycidyl groups.

19. Compositions according to claim 1, wherein the crosslinking agent is used in an amount of from 0.25 to 1.4, equivalent of carboxylic groups existing in the semicrystalline polyester (a) and the amorphous polyester (b) per equivalent of epoxy or β-hydroxyalkyl groups.

20. Compositions according to claim 1, wherein from 4 to 50 parts by weight of the crosslinking agent, from 5 to 38.4 parts by weight of the semicrystalline polyester (a) and from 30 to 86.4 parts by weight of the amorphous polyester (b), with respect to the total weight of the crosslinking agent and the polyester, are used.

21. Compositions according to claim 1, wherein they furthermore contain up to 5% by weight, with respect to the weight of the polyesters (a) and (b), of a crosslinking catalyst.

22. Compositions according to claim 1, wherein they contain up to 10% by weight, with respect to the weight of the polyesters (a) and (b), of at least one stabilizer selected from the group consisting of compounds absorbing ultraviolet radiation and/or sterically hindered amines.

23. Process for coating an article, wherein a thermosetting powder composition according to claim 1 is applied to the said article by spray deposition using an electrostatic or triboelectric gun or by fluidized-bed deposition, and wherein the coating thus obtained is subjected to a curing operation at a temperature of from 150 to 220° C. for a time of between approximately 5 to 35 minutes.

24. The composition of claim 2, wherein said straight chain saturated aliphatic dicarboxylic acid is adipic acid.

25. Composition according to claim 19, wherein the crosslinking agent is used in an amount of from 0.6 to 1.05 equivalent of carboxyl groups existing in the semicrystalline polyester (a) and the amorphous polyester (b) per equivalent of epoxy or β-hydroxyalkyl groups.

26. The process of claim 23 wherein the article is metal.

* * * * *